US008271736B2

(12) United States Patent
Gupta et al.

(10) Patent No.: US 8,271,736 B2
(45) Date of Patent: Sep. 18, 2012

(54) DATA BLOCK FREQUENCY MAP DEPENDENT CACHING

(75) Inventors: Karan Gupta, San Jose, CA (US); Tarun Thakur, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 12/027,983

(22) Filed: Feb. 7, 2008

(65) Prior Publication Data

US 2009/0204765 A1 Aug. 13, 2009

(51) Int. Cl.
*G06F 12/00* (2006.01)
(52) U.S. Cl. .................. 711/133; 711/E12.026
(58) Field of Classification Search .............. None
See application file for complete search history.

(56) References Cited

U.S. PATENT DOCUMENTS

| 5,043,885 | A | 8/1991 | Robinson | |
|---|---|---|---|---|
| 5,455,941 | A * | 10/1995 | Okuno et al. | 1/1 |
| 6,269,423 | B1 | 7/2001 | Kishi | |
| 7,076,611 | B2 * | 7/2006 | Steere et al. | 711/133 |
| 7,185,145 | B2 * | 2/2007 | Mizushima et al. | 711/115 |
| 7,243,339 | B2 * | 7/2007 | Subrahmanyam et al. | 717/130 |
| 7,568,068 | B2 * | 7/2009 | Kulkarni et al. | 711/113 |
| 2001/0005682 | A1 * | 6/2001 | Terao et al. | 455/550 |
| 2001/0034827 | A1 * | 10/2001 | Mukherjee et al. | 712/225 |
| 2002/0046338 | A1 * | 4/2002 | Ueda et al. | 713/168 |
| 2003/0009749 | A1 * | 1/2003 | Subrahmanyam et al. | 717/154 |
| 2003/0018918 | A1 * | 1/2003 | Natsuno et al. | 713/201 |
| 2003/0110296 | A1 * | 6/2003 | Kirsch et al. | 709/246 |
| 2003/0229761 | A1 * | 12/2003 | Basu et al. | 711/134 |
| 2004/0215910 | A1 * | 10/2004 | Okaue et al. | 711/164 |
| 2005/0005131 | A1 * | 1/2005 | Yoshida et al. | 713/183 |
| 2005/0027943 | A1 * | 2/2005 | Steere et al. | 711/133 |
| 2005/0086471 | A1 * | 4/2005 | Spencer | 713/165 |
| 2006/0289659 | A1 * | 12/2006 | Mizushima | 235/492 |
| 2007/0050548 | A1 * | 3/2007 | Bali et al. | 711/118 |
| 2007/0106666 | A1 * | 5/2007 | Beckerle et al. | 707/7 |
| 2008/0114930 | A1 * | 5/2008 | Sanvido et al. | 711/113 |
| 2008/0144079 | A1 * | 6/2008 | Pandey et al. | 358/1.15 |
| 2008/0263363 | A1 * | 10/2008 | Jueneman et al. | 713/184 |

* cited by examiner

*Primary Examiner* — Jasmine Song
*Assistant Examiner* — Daniel Bernard
(74) *Attorney, Agent, or Firm* — GSS Law Group

(57) ABSTRACT

A method for increasing the performance and utilization of cache memory by combining the data block frequency map generated by data de-duplication mechanism and page prefetching and eviction algorithms like Least Recently Used (LRU) policy. The data block frequency map provides weight directly proportional to the frequency count of the block in the dataset. This weight is used to influence the caching algorithms like LRU. Data blocks that have lesser frequency count in the dataset are evicted before those with higher frequencies, even though they may not have been the topmost blocks for page eviction by caching algorithms. The method effectively combines the weight of the block in the frequency map and its eviction status by caching algorithms like LRU to get an improved performance and utilization of the cache memory.

11 Claims, 2 Drawing Sheets

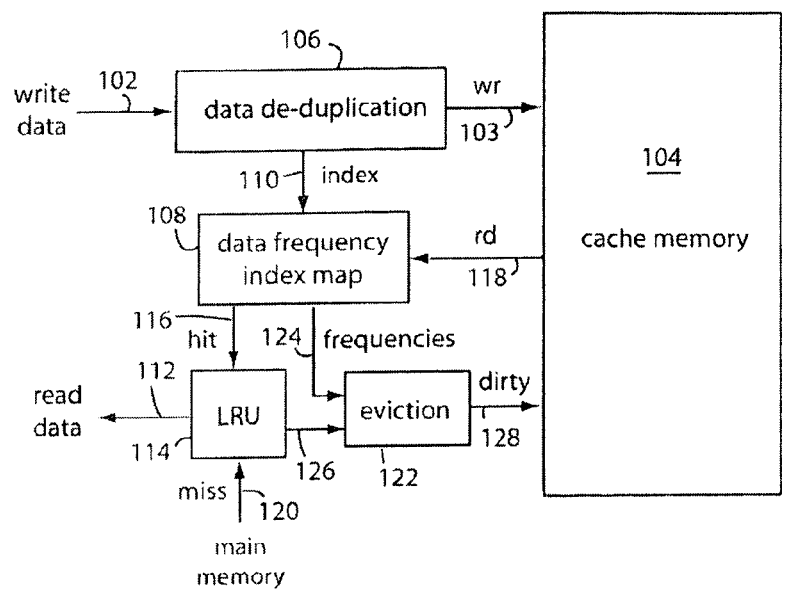
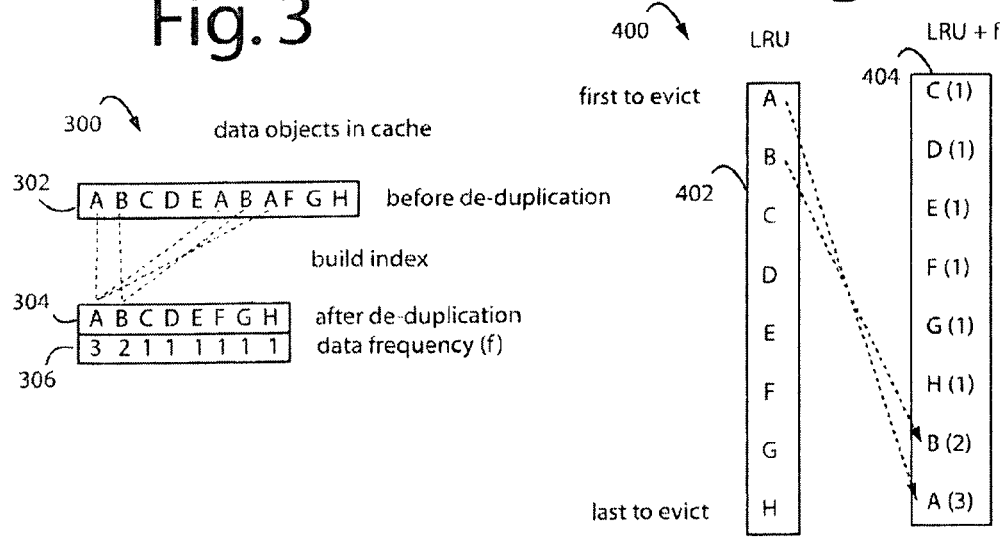

DATA BLOCK FREQUENCY MAP DEPENDENT CACHING

FIELD OF THE PRESENT INVENTION

The present invention relates to computer cache memory systems with data de-duplication technology, and in particular to caching systems that use a data block frequency and least recently used information for cache page eviction decisions.

BACKGROUND

Computers tend to access program and data memory non-evenly, where some memory addresses are accessed more frequently than others. Some types of memory can be accessed more rapidly than other types, thus keeping the computer waiting at idle less during access. Fast memory devices, like those used for cache memory, are expensive and not practical to be used for the whole memory and data space. Disk storage is much slower to access, but is very attractive because its cost per byte of storage is low as compared to other memory systems. The best balance between performance and system cost generally means using a combination of cache memory, main random access memory (RAM), and disk storage. System performance will thus be least adversely impacted if the program and data that need to be accessed the most frequently are kept available in the cache memory.

Determining what to put in the cache can be difficult. Many different algorithms and schemes have been tried. The problem generally boils down to which policies to use for populating the cache store and for page eviction. The primary objective is to have a page of memory already fetched to the cache before it's needed, and flushed out of the cache back to main memory when other pages need the room and will be needed sooner or more often. A number of algorithms exist that define the policies that are employed for both pre-fetch and eviction. One assumption often employed, is pages that have been recently used will be needed again soon. Another assumption is the next page following a page recently accessed will probably be accessed again in the future.

Conventional least recently used (LRU) techniques have been included in the cache components of storage controllers and tape servers to control which pages to evict and when to evict a page. LRU techniques usually manage, control, and access metadata describing which data in cache memory has not yet been written back into main storage, so-called dirty data, and how long the data has been dirty. Improving performance by assigning weights, e.g., time to fetch the object, object sizes, etc., to the LRU for cache replacement is conventional and existing prior-art.

Data de-duplication, a relatively new technology employed in storage and tape servers, reduces storage needs by eliminating redundant data. Only one instance of each unique data is retained on a storage device such as disk or tape. Redundant data is replaced with a pointer to the unique data. For example, a typical email system may have one hundred instances of the same one megabyte file attachment. If the email platform is backed up or archived, then all one hundred instance will be saved, requiring 100 MB storage space. With data de-duplication, the one hundred instances are reduced to one unique instance of the attachment, and that one is the entirety of what actually needs to be stored. Each duplicate instance is referenced back to the one saved copy. In such example, a need for 100 MB of storage could be reduced to approximately 1 MB.

Data de-duplication, or "single instance storage" technology, scans incoming data for similarities, and creates and stores an index of duplicate blocks for data retrieval. It compares the incoming data with the most similar in a storage unit. If the incoming data is determined to be new, the new data is compressed and stored while also updating an index metric with knowledge of the new data. In the process of data reduction or commonality factoring, a table or index is constructed and maintained that maps duplicate objects to a single copy of the object. Later, when a request for the duplicated object comes in, the object mapping is used to index to the single copy of the object.

Data de-duplication offers other benefits. Lower storage space requirements may reduce disk expenditure costs. The more efficient use of disk space also allows for longer disk retention periods, which provides better recovery time objectives (RTO) for a longer time and reduces the need for tape backups. Data de-duplication also reduces the data that must be sent across a WAN for remote backups, replication, and disaster recovery.

Data de-duplication can generally operate at the file, block, and even the bit level. File de-duplication eliminates duplicate files (as in the example above), but this is not an efficient means of de-duplication. Block and bit de-duplication looks within a file and saves unique iterations of each block or bit. Each chunk of data is processed using a hash algorithm such as MD5 or SHA-1. This process generates a unique number for each piece which is then stored in an index. If a file is updated, only the changed data is saved. That is, if only a few bytes of a document or presentation are changed, only the changed blocks or bytes are saved, the changes don't constitute an entirely new file. This behavior makes block and bit de-duplication far more efficient. However, block and bit de-duplication take more processing power and uses a much larger index to track the individual pieces.

Hash collisions are a potential problem with de-duplication. When a piece of data receives a hash number, that number is then compared with the index of other existing hash numbers. If that hash number is already in the index, the piece of data is considered a duplicate and does not need to be stored again. Otherwise the new hash number is added to the index and the new data is stored. In rare cases, the hash algorithm may produce the same hash number for two different chunks of data. When a hash collision occurs, the system won't store the new data because it sees that its hash number already exists in the index. This is called a false positive, and can result in data loss. Some vendors combine hash algorithms to reduce the possibility of a hash collision. Some vendors are also examining metadata to identify data and prevent collisions.

In actual practice, data de-duplication is often used in conjunction with other forms of data reduction such as conventional compression and delta differencing. Taken together, these three techniques can be very effective at optimizing the use of storage space.

SUMMARY OF THE PRESENT INVENTION

A cache system embodiment of the invention includes a caching algorithm that depends in part on a data block de-duplication frequency map for page prefetching, and its page eviction policy. Data items that have lesser frequencies of use are evicted before those with higher frequencies even though they may not have been the least recently used. Single instance storage is used for data de-duplication that incidentally provides an object frequency index map. When a request comes in for a page not already in cache, a least recently used algorithm employs the object frequency index map to select data objects for eviction with lesser frequencies.

A method is provided that improves cache performance by leveraging the object frequency map as a hint to the cache performance for efficient page pre-fetch and page eviction policy. The invention also includes a caching methodology that keeps data blocks in cache memory that are used more often in systems employing data-duplication technology. Also provided is a cache system that significantly improves system performance over conventional least recently used algorithms.

The above summary of the invention is not intended to represent each disclosed embodiment, or every aspect, of the invention. Other aspects and example embodiments are provided in the figures and the detailed description that follow.

BRIEF DESCRIPTION OF THE DRAWINGS

The present invention may be more completely understood in consideration of the following detailed description of various embodiments of the invention in connection with the accompanying drawings, in which:

FIG. 1 is a functional block diagram of a cache system embodiment of the invention showing how a data de-duplicator provides data block frequency information that is combined with LRU decisions to select which data blocks to pre-fetch and evict from cache;

FIG. 3 is a diagram representing how a cache memory with data-duplication is transformed into a single instance with a frequency map for a cache system embodiment of the invention; and FIG. 4 is an example showing how the proposed method would re-order a straight LRU would based on a data-duplication frequency map as in FIG. 3, in a cache system embodiment of the invention.

Figure 2:
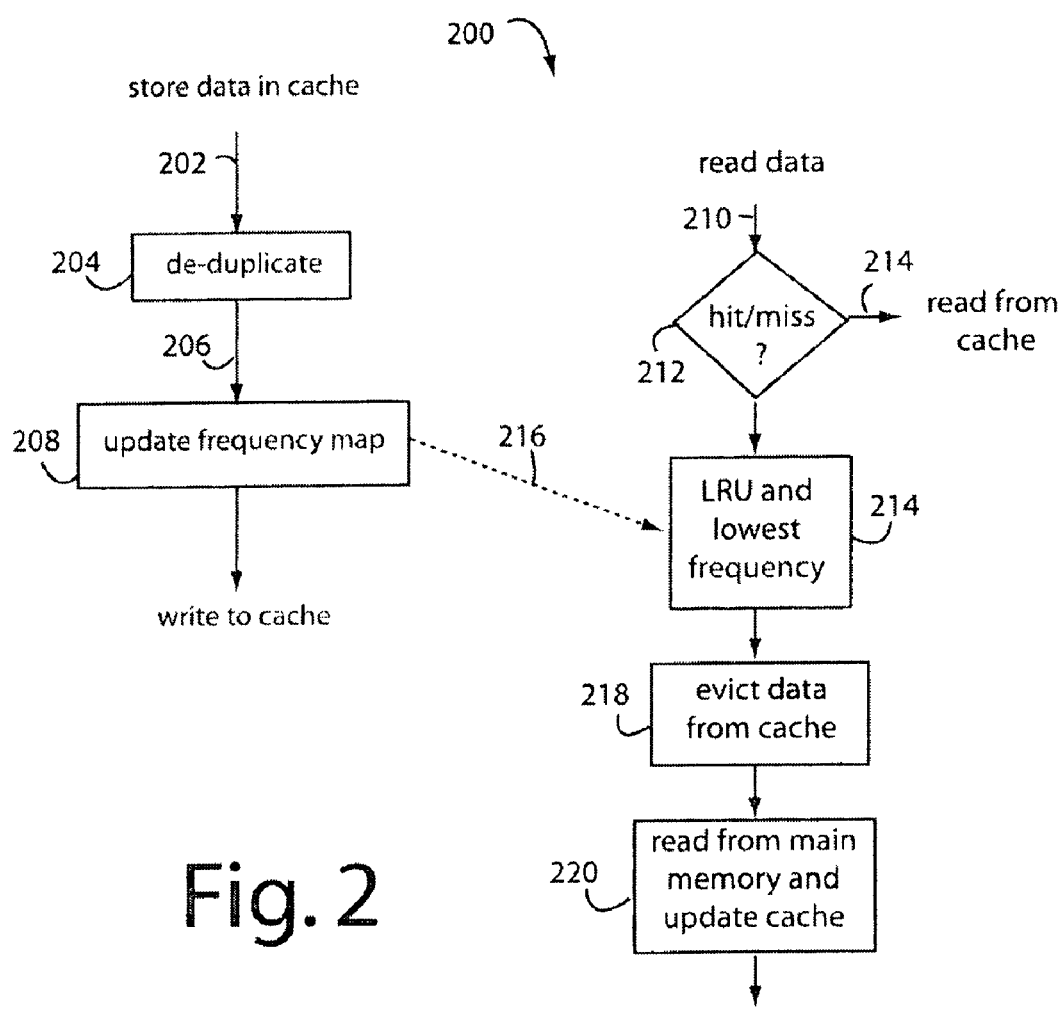
FIG. 2 is a flowchart diagram of a cache method embodiment of the invention showing how a data de-duplicator process provides frequency information that is used by a LRU process to select which data blocks to pre-fetch and evict from cache.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

In the following detailed description of the preferred embodiments, reference is made to the accompanying drawings, which form a part hereof; and within which are shown by way of illustration specific embodiments by which the invention may be practiced. It is to be understood that other embodiments may be utilized and structural changes may be made without departing from the scope of the invention.

FIG. 1 represents a cache system embodiment of the invention, and referred to herein by the general reference numeral 100. Cache system 100 accepts write data 102 from hosts, or something similar, that it then decides to place in a cache memory 104. A data de-duplication engine 106 tests the write data for duplication in the cache memory 104 and writes an index and frequency for such in a data frequency index map 108. The result is a single instance of duplicate data, with an index 110. A read data 112 access request, e.g., from the central processing unit (CPU), activates a least recently used (LRU) algorithm 114. If there is a cache hit 116, a read cycle 118 is supported from the cache memory 104. Otherwise, in case of a cache miss 120, the system starts a read cycle from a slower data storage device.

But before any new data can be read into the system cache, existing data from system cache has to be evicted to make space for new data to be stored in system cache. An object frequency index map may be used to decide which data block to evict from the system cache. An eviction controller 122 consults the respective frequencies 124 form the data frequency index map 108 and an LRU list 126 from the LRU algorithm 114. It selects the data object with the lowest frequency and least recently used. A "dirty" marker 128 is sent to the cache memory 104 to indicate which data object is to be replaced in the consequential write data 102 that follows.

Data objects or blocks with lower frequencies than others will be evicted first, and data objects less recently used than others with the same frequencies will be evicted first.

FIG. 2 represents one embodiment, and is referred to herein by the general reference numeral 200. Cache method 200 has two operators, one that de-duplicates data being stored in cache memory, and another that uses a data object frequency map generated during de-duplication to prioritize data objects for cache eviction. A store in cache operation 202 begins with a de-duplication 204 to eliminate duplicated data objects from cache memory. An index and frequency 206 are used in an update frequency map process 208. A read data operation 210 causes a check hit/miss 212 to see if the requested data object is in cache memory. If it is, a read from cache cycle 214 proceeds. Otherwise, a cache miss means the data block needs to be brought into cache from the main memory. e.g., a storage device. A method 216 decides which existing data object should be replaced, or evicted, based on an LRU algorithm and a frequency 218 provided by the frequency map. Essentially, the first data objects to evict if space is needed in the cache are those that have the lowest data duplication frequency, and then the least recently used within a single category of data duplication frequency. In other words, all data objects with a data duplication frequency of "1" will be evicted before any others with a data duplication frequency of "2" or greater. A process 218 executes the eviction, e.g., by marking the data object in the cache as "dirty". A process 220 proceeds to read the requested data object into the cache memory.

Other cache eviction and write policies could be used, and the invention is not limited to those incidental methods described herein. Embodiments could use a data de-duplication process to generate a data object frequency table. LRU operation of the cache memory is then controlled by the data object frequency table.

The example 300 in FIG. 3 represents a cache memory 302 with sample data objects A, B C, D, E, A, B, and A. The system cache with such contents could benefit from de-duplication because the last three slots duplicate data object A twice, and data object B once. After de-duplication, a duplication index is built and the frequency of each data object is constructed and maintained. A cache memory 304, the same size as cache memory 302 can now store in this example three more data objects, e.g., F, G, and H. A frequency table 306 tallies how many times the de-duplicator was able to reduce duplication for each corresponding data object, A-H.

FIG. 4 represents a method 400 for reordering which data blocks to evict from a cache memory first, and follows the examples of FIGS. 1-3. A least recently used order 402 would be the conventional way to do it. But the LRU+f order 404 shows how LRU order 402 is reshuffled according to the data frequency (f) from frequency table 306. Data objects with frequencies of "1" are less costly in cache misses than those with frequencies of "2". Data object A has a frequency of "3", and is therefore retained in the cache longer than data object B which has a lesser frequency of "2", enough though A was less recently used than B.

Variations on the LRU ordering of data objects with frequencies higher than "1" can be tried. For example, the LRU order may reflect the LRU value of the oldest member, the youngest member, or the average cache residence term. What is meant by this is diagrammed in FIG. 3 as cache memory 302. Each of the three instances of A will have their own access histories. A cache hit on any one of the instances of A could be used to move the LRU order of data object A toward the last to evict. Or it could be required that all instances of data object A being accessed are averaged for LRU ordering purposes.

If the copy of the object exists in cache, then cache will just serve the object and update the entry of that object in its own table based on LRU scheme. If the copy of the object does not exist in cache and cache is full, then cache needs to evict an object to bring the object from the store to cache.

In general, LRU information is coupled with the index map generated by data-de-duplication to generate significant performance gains and better cache management. A cache component added to the LRU information is employed for eviction of blocks from cache to also include the data block frequency index map in the page eviction algorithm. This index map or metric maintained and managed by data-de-duplication, is defined as the frequency of the object in the data store. The higher the frequency of an object in data Store, the higher the access frequency. Such frequency can be calculated from the table or index generated by the data de-duplication.

In another example, consider two data objects 1 and 2, having four blocks each, and block 1 in data object 1 and block 7 in data object 2 have same contents, as do block 2 in data object 1, and block 8 in data object 2:

| Object 1: | |
|---|---|
| Block | Hash |
| 1 | a |
| 2 | b |
| 3 | c |
| 4 | d |

| Object 2: | |
|---|---|
| Block | Hash |
| 5 | e |
| 6 | f |
| 7 | a |
| 8 | b |

When this stream of data objects is fed into the system, the data de-duplication constructs a object frequency index map having the frequency as:

| Block | Frequency Count Value |
|---|---|
| a | 2 |
| b | 2 |
| c | 1 |
| d | 1 |
| e | 1 |
| f | 1 |

Consider a cache size of four blocks, and a state of: 1(a) 2(b) 3(c) 4(d). Suppose a request comes from a host or likes to read block 5 which has state "e". We assert that to furnish this read request, instead of evicting block 2 (as would have done by legacy LRU technique) which has state "b", the caching system should evict block 3 which has state "c". From object frequency index map, since the frequency for data block "b" is 2 which is greater than that of block 3, the probability to read block 2 and block 8 each having state "b" is more than just reading block 3. Such method of incorporating frequency weights generated by data de-duplication method with the LRU can provide significant measurable performance benefits an otherwise conventional system.

While the invention has been described with reference to several particular example embodiments, those skilled in the art will recognize that many changes may be made thereto without departing from the spirit and scope of the invention, which is set forth in the following claims.

The invention claimed is:

1. A method for increasing cache memory performance and utilization, comprising:
   combining a data block frequency map generated by a data de-duplication mechanism with a page prefetching and eviction process;
   using said data block frequency map to provide weights that are directly proportional to a corresponding frequency count of a data block in a dataset;
   creating a set of de-duplicated data blocks in the cache memory with the data de-duplication mechanism;
   ordering the set of de-duplicated data blocks in the cache memory according to the corresponding frequency count for each of the de-duplicated data blocks;
   ordering de-duplicated data blocks having a same frequency count in the cache memory into a least recently used order according to an average value of a cache residence term for each de-duplicated data block;
   influencing a caching algorithm controlling said page prefetching and eviction process with said weights;
   evicting the data block from the cache memory when the frequency count for the data block is greater than zero; and
   evicting all data blocks having a same frequency count that is less than or equal to the frequency count of other data blocks from the cache memory, with data blocks having a same frequency count evicted in the least recently used order according to an average value of a cache residence term, before evicting any data block with a higher frequency count.

2. The method of claim 1, wherein cache memory performance and utilization are substantially improved by including said weight of blocks in the frequency map and its eviction status with said caching algorithm.

3. A device for increasing cache memory performance and utilization, comprising:
  a cache memory;
  a data de-duplication engine in data communication with said cache memory;
  a data block frequency map for receiving a frequency count for a data block from said data de-duplication engine; and
  an eviction controller in data communication with said cache memory and adapted to receive frequency counts from said data frequency map and further adapted to select a next data block to be deleted from said cache memory from among a group of data blocks having a same frequency count and arranged within said group in a least recently used order according to an average value of a cache residence term for each data block,
  wherein, said data block frequency map provides weights that are directly proportional to a corresponding frequency count of a block in a dataset, a data block having a nonzero frequency count is deletable, said weights are used to influence a caching algorithm controlling said page prefetching and eviction process, and, during operation, all data blocks that have a lesser frequency count in said dataset are evicted in said least recently used order according to said average value of said cache residence term before any others with higher frequencies, even though such may not have been a first block for page eviction decided by said caching algorithm.

4. The device of claim 3, wherein cache memory performance and utilization are substantially improved by including said weight of blocks in the frequency map and its eviction status with said caching algorithm.

5. The method of claim 3, wherein said caching algorithm embodies a least recently used (LRU) policy.

6. A cache memory system, comprising:
  a data de-duplicator for eliminating duplicate data objects in a cache memory and for building a data object frequency map comprising a frequency of duplicate data objects; and
  a least recently used (LRU) cache manager for arranging data objects into groups in said cache memory, each of said groups comprising data objects having a same value of said frequency, and data objects in each of said groups ordered into a least recently used order according to an average value of a cache residence term for each data object, and for evicting data objects from said cache memory from a group of data objects having a lowest frequency greater than zero indicated by a corresponding value in said data object frequency map, and for evicting data objects in each of said groups in a least recently used order according to an average value of a cache residence term for each data object.

7. The cache memory system of claim 6, further comprising:
  a data frequency index map device for storing and providing access to said data object frequency map.

8. The cache memory system of claim 6, further comprising:
  an LRU device which implements a least recently used algorithm and which tracks cache access hits and misses.

9. The cache memory system of claim 6, further comprising:
  a data frequency index map device for storing and providing access to said data object frequency map;
  an LRU device which implements a least recently used algorithm and which tracks cache access hits and misses; and
  an eviction device connected to be able to read said data object frequency map, and read the LRU device, and providing for a selection of which data objects to evict from said cache memory.

10. The cache memory system of claim 6, wherein caching memory depends on a data block frequency map for page prefetching, and a page eviction policy, and data items that have lesser frequencies of use are evicted before those with higher frequencies, even though they may not have been the least recently used.

11. A computer program product, comprising:
  a non-transitory computer-readable medium;
  means, provided on the computer-readable medium, for forming a table comprising a frequency of duplicate data objects in a cache memory;
  means, provided on the computer-readable medium, for ordering the data objects in the cache memory according to their corresponding frequencies from the table;
  means, provided on the computer-readable medium, for forming groups of data objects, each group comprising data objects with a same frequency, and within each group, ordering the data objects in a least recently used order according to an average value of a cache residence term for each data object;
  means, provided on the computer-readable medium, for evicting from the cache memory a data object selected from a group of data objects having a least value of frequency, and from among the group of data objects comprising a least value of frequency, for evicting the least recently used data object according to the average value of the cache residence term for each data object; and
  means, provided on the computer-readable medium, for evicting all data objects from a group of data objects having a least value of frequency before ejecting a data object from a group of data objects having a higher value of frequency.

* * * * *